J. E. ALPINE.
CARBURETER.
APPLICATION FILED JUNE 5, 1918.
1,397,711.
Patented Nov. 22, 1921.
2 SHEETS—SHEET 1.
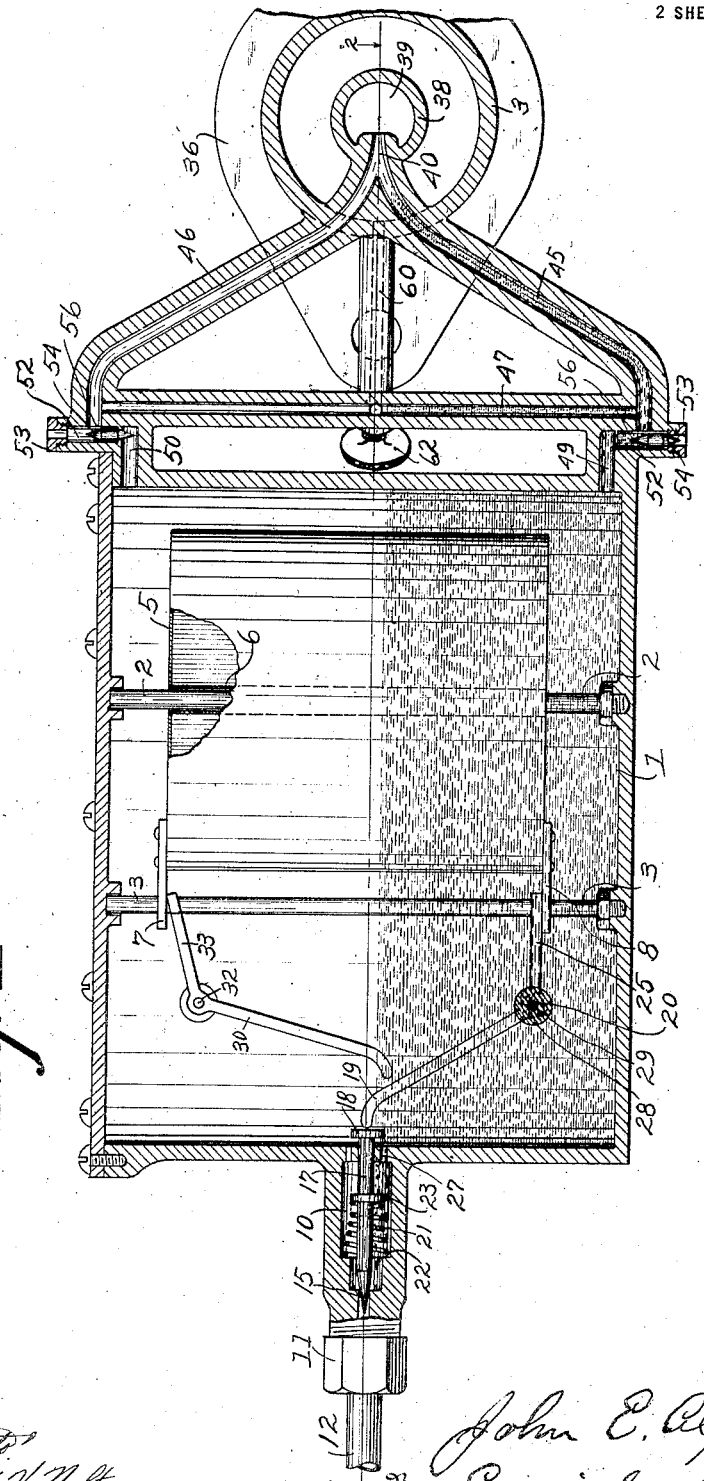

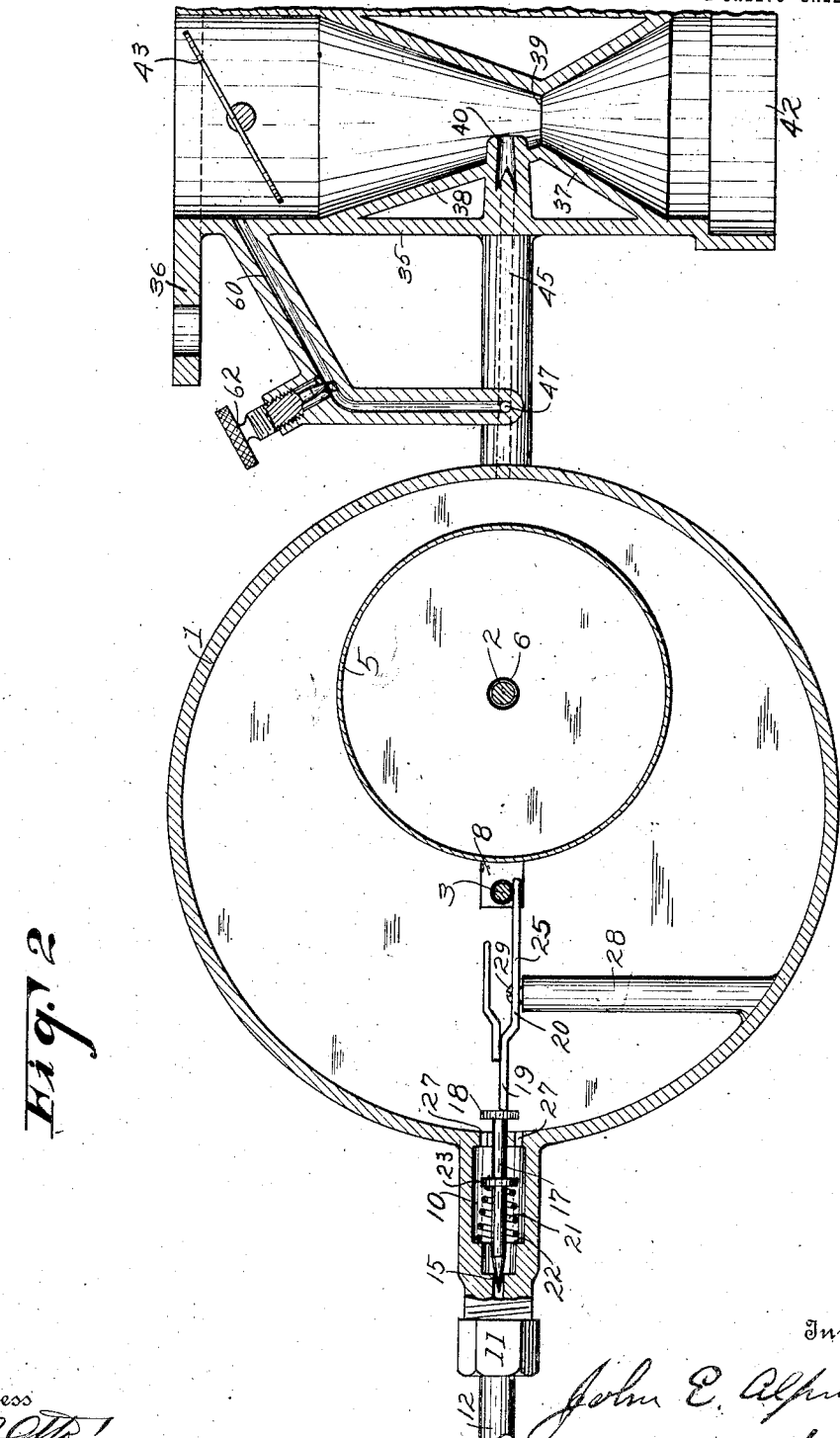

UNITED STATES PATENT OFFICE.

JOHN E. ALPINE, OF GREEN BAY, WISCONSIN.

CARBURETER.

1,397,711.  Specification of Letters Patent.  Patented Nov. 22, 1921.

Application filed June 5, 1918. Serial No. 238,272.

*To all whom it may concern:*

Be it known that I, JOHN E. ALPINE, a citizen of the United States, residing at Green Bay, county of Brown, and State of Wisconsin, have invented new and useful Improvements in Carbureters, of which the following is a specification.

My invention relates to improvements in carbureters. The object of my invention is to provide a carbureter having a reversible float chamber and a horizontally disposed mixing chamber or passage, whereby my improved carbureter may be attached to a manifold on either the right or left hand side of an internal combustion engine. Also to provide a carbureter which will not become flooded when used on an aeroplane motor.

In the drawings:—

Figure 1 is a sectional view of a carbureter embodying my invention, drawn to a vertical plane substantially on the axes of the float supporting guide rods, but showing the guide rods, the float and the valve controlling levers in full.

Fig. 2 is a sectional view, drawn to a horizontal plane on line 2—2 of Fig. 1.

Like parts are identified by the same reference characters throughout both views.

The float chamber 1 is preferably cylindrical in form, and is provided with vertically disposed guide rods 2 and 3 respectively. Guide rod 2 extends through the float 5, the latter being provided with a tube 6 which extends therethrough and surrounds the rod 5, as shown in Fig. 1. At one side the float is provided with brackets or apertured plates 7 and 8, through which guide rod 3 passes. Two guide rods 2 and 3 therefore hold the float against rotation, while permitting it to freely move vertically within float chamber 1.

The outer end of the float chamber is provided with a tubular valve chamber 10, the outer end of which has a coupling nut 11 adapted to facilitate connecting a fuel supply pipe 12. Within the valve chamber 10 a needle valve 15 is located. This valve seats against the pressure of the in-feeding liquid fuel from pipe 12. An extension 17 of the valve 15 extends through an aperture in the end wall of the float chamber, and is provided with a head 18 within the float chamber, against which the extremity 19 of bell crank 20 is adapted to bear, whereby the valve may be held to its seat against the pressure of liquid in the pipe 12. A spring 21 within the valve chamber, interposed between shoulder 22 and valve stem collar 23, tends to retract the valve under light pressure, this pressure being sufficiently light to be easily overcome by the float 5. The bracket 8 bears against the short arm 25 of the bell crank 20 on the under side of said arm 25. When the level of the liquid within the float chamber is sufficiently depressed to relieve bell crank 20 from the effective pressure of the float, needle valve 15 will be retracted by spring 21, and additional liquid fuel will be delivered through pipe 12 into the float chamber, entering that chamber through the ports 27.

It will be observed that the bell crank 20 is fulcrumed at 29 to a projecting arm 28 within the float chamber. Another bell crank 30 is fulcrumed at 32 in the upper portion of the float chamber, and the short arm 33 of this bell crank engages the inner face of the bracket 7, *i. e.*, the lower face of said bracket in the position occupied by the float chamber in Fig. 1. The bell crank 30 is substantially the same in structure as the bell crank 20, and it is so arranged as to swing inwardly past the extremity 19 of the bell crank 20 into engagement with the head 18 on the valve stem, these bell crank levers being arranged in different planes as shown in Fig. 2. It is possible for both bell cranks to be in engagement with the valve stem at the same time, although this will not occur in the use of the carbureter, for the reason that when the float chamber is in the Fig. 1 position, with a supply of liquid supporting the float, bell crank 20 will be swung to the position in which it is illustrated in said figure, and the long arm of bell crank 30 will drop by gravity to the position in which it is illustrated in Fig. 1. It will be obvious, however, that if the float chamber is inverted the tendency of the float to rise will swing arm 30 into engagement with the head 18 of the valve stem, and the long arm of bell crank 20 will drop by gravity until it occupies the position similar to that occupied by bell crank 30 in Fig. 1.

The mixing chamber comprises a horizontally disposed tubular member 35 having a flange 36 at one end, whereby it may be secured to the engine or its manifold. The interior portion of the mixing chamber is provided with walls 37 and 38 which converge to an aperture at 39, forming a contracted passage, between which and the outlet of the mixing chamber the fuel supply duct or nozzle 40 is located, the nozzle proper being preferably horizontally disposed, as shown. The outer end of the tubular member or wall of the mixing chamber 35 is open at 42 for the admission of air, and the inner or outlet end of the chamber is provided with an ordinary throttle valve 43.

The nozzle 40 is connected with the float chamber at the bottom and top of the latter by ducts 45 and 46, these ducts being connected by a vertical duct 47 near their connection with the float chamber for a purpose hereinafter explained.

Between the vertical duct 47 and the outlet passages 49 and 50 of the float chamber I provide a vertically disposed passage 52, the outer end of which is closed by an apertured nut 53, which constitutes a valve seat for a valve 54.

The upper valve 54 drops by gravity to the position in which it is shown in Fig. 1, thereby admitting air through the nut 53 at the top of the carbureter, this air being mixed with liquid drawn into the mixing chamber under engine suction, the mixture of air and liquid taking place within the nozzle 40. The air current delivered to the nozzle through the passage 46 tends to break up or atomize the stream of liquid passing upwardly through the duct or passage 45 and thereby delivers the liquid fuel to the mixing chamber in a partially broken up or separated state aiding materially in the atomizing of the fuel.

It will, of course, be understood that when the float chamber is inverted the passage 45 becomes the air passage, and the passage 46 becomes the liquid passage. The valve 54 which is uppermost in Fig. 1, and which occupies an open position with reference to the aperture in nut 53, will then close and the lower valve 54 in Fig. 1 will become the upper valve, and will drop to open position.

The cross passage 47 communicates with an auxiliary duct 60 leading to the mixing chamber tube 35 beyond the throttle valve 43. The capacity of this passage is regulated by an adjustable screw 62 which operates as a cross valve within the passage 60. This passage is adapted to deliver a minimum supply of fuel to the engine when the throttle valve is substantially closed. It is also used for starting the engine when the engine and the fuel are cold, the valve 62 being then opened sufficiently to allow an enrichment of the combustible charge to be delivered to the engine. The specific construction of the mixing chamber with the nozzle and cross passages is not regarded as essential to my invention, except in so far as the passages leading to the nozzle from the top and bottom portions of the float chamber enable me to supply the nozzle with fuel with the float chamber in either its Fig. 1 position, or in the position inverted from that in which it is illustrated in Fig. 1; also the particular means for controlling the admission of air to the nozzle ducts in either position of float chamber adjustment is not regarded as essential, although it is extremely important that some means should be provided for admitting an aspirating air current, or an atomizing air current to the liquid fuel within the nozzle with like effects in either position of the float chamber.

It will be observed that the vertically disposed portion 52 of the nozzle ducts 45 and 46 is provided at its inner end with an apertured wall 56. The valves are pointed at both ends, and when the upper valve drops to open position, so far as the air port in nut 53 is concerned, it moves to a position where it cuts off communication with the float chamber. The other valve 54 simultaneously cuts off communication with the open air at the bottom of the float chamber, and prevents the escape of liquid fuel through the aperture or port in the lower nut 53.

I claim:—

1. In a carbureter, the combination with a mixing chamber provided with a fuel inlet nozzle, of a float chamber connected at top and bottom with the nozzle, and provided with a fuel inlet, a valve controlling fuel deliveries to the float chamber through said inlet, connections for operating the valve from the float when the float chamber is in one position of adjustment, and other connections adapted to operate the valve from the float when the float chamber is inverted from its first mentioned position.

2. In a carbureter, the combination of a float chamber, a mixing chamber, a nozzle located substantially in the central horizontal plane of the float chamber, and adapted for fuel delivery to the mixing chamber, fuel supply connections leading from the top and bottom of the float chamber to the nozzle, a float within the float chamber, fuel supply connections for the float chamber, and means for utilizing the float to regulate the flow of fuel to the float chamber when the float has moved a predetermined distance toward either the top or bottom wall of said chamber.

3. In a carbureter, the combination of a mixing chamber provided with a fuel inlet nozzle, a float chamber, ducts leading from the top and bottom portions of the float chamber to the nozzle, and having the central horizontal plane of the float chamber substantially at the level of the nozzle outlet, a float within the float chamber, guides for the float, a fuel inlet valve for the float chamber, and means for utilizing the movement of the float in either direction to close the fuel inlet valve when the float has moved a predetermined distance in either direction from said central horizontal plane.

4. The combination set forth in claim 3, in which the nozzle ducts are provided with vertically movable air inlet valves arranged to drop by gravity to open position at the upper side of the float chamber, and to closed position at the lower side, whereby the duct from the upper portion of the float chamber may admit air to the nozzle to atomize the fuel delivered to the nozzle through the lower duct, substantially as described.

5. The combination set forth in claim 4, in which the gravity operated valves are adapted, when open for the admission of air, to close communication with the float chamber.

In testimony whereof I affix my signature in the presence of two witnesses.

JOHN E. ALPINE.

Witnesses:
O. C. WEBER,
A. J. McKERIHAN.